May 31, 1932.  A. C. ARENS  1,861,254

WEED OR VERMIN KILLING DEVICE

Filed Aug. 25, 1930

Inventor

Albert C. Arens

By Peter C. McNulty

Attorney

Patented May 31, 1932

1,861,254

UNITED STATES PATENT OFFICE

ALBERT C. ARENS, OF MILWAUKEE, WISCONSIN

WEED OR VERMIN-KILLING DEVICE

Application filed August 25, 1930. Serial No. 477,720.

The invention relates to a device and method for introducing plant-killing or disinfecting compounds into or in the near vicinity of the roots of growing plants or into or near the burrows of insects, small vermin or other living bodies on or below the surface of the ground, of which the following is a full and complete description.

It is the purpose of my invention to supply a device for introducing a plant-killing or vermin-killing fluid at or immediately below the surface of the ground, whereby the slow and laborious means which have been used and which up to the present time have made such methods of destroying weeds and vermin expensive and unpopular can be replaced with a rapid, easy and inexpensive hand operation.

The problem of removing dandelions and other small weeds from lawn surfaces has been met up to the present time by laborious and expensive means. The most effective manner of ridding lawn surfaces of such weeds has been to dig the undesired plants by hand and this method is still widely practiced today in spite of its great expense. Where a large area is to be treated many efforts have been put forth to find cheaper methods. It has long been known that certain sprays, such as solutions of iron sulfate or other iron compounds will preferentially kill the dandelion foliage in the presence of growing grass, but the dandelion roots are not destroyed and soon re-establish themselves. Repeated application of this kind of spray is required if the dandelion is to be completely removed. The repeated application of the iron compound spray is expensive and laborious and eventually produces a detrimental effect upon the grass itself.

Another means of destroying weeds in lawn surfaces, playing surfaces, such as tennis courts and baseball diamonds or cultivated soil is to pierce the roots of the dandelion or other plant by passing a common ice pick downward through the center of them. Into the cavity thus formed gasoline or other volatile hydrocarbon oil, poisonous to the plant, is introduced with a common oil can. This set of operations, although an improvement over digging out the offensive plant, still is a very laborious one and is slow and expensive.

Other methods of treatment have been devised, such as removing the blossoms of the offending plants before seed can form and thus eventually driving out the undesired plants. A special rake has been designed for this purpose which removes the blossoms and foliage.

In addition to these attempts, efforts have been made to combine in one device the idea of the ice pick and the idea of the oil can filled with gasoline. In these devices the labor involved in their use is very little lightened, for the operator must stoop or bend to use the device and the piercing operation and the releasing of the fluid must be accomplished as two operations.

To my knowledge, prior to my invention, a method which is simple and cheap and at the same time completely and thoroughly effective, has not been brought to the attention of the public. The device which I describe is one which provides means for destroying small plants and vermin quickly, easily and cheaply. The labor involved in its use is light, the operator being able to stand in a comfortable, upright position. The operator's position permits such facility of movement that large numbers of plants or burrows may be treated in a short time. In my device the skewer can be driven quickly and easily into the root of the undesired plant, badly damaging the root mechanically through destructive contact, at the same time delivering a dose of fluid deadly to the plant. The delivery of the dose of poison is accomplished through the pressure exerted on the skewer and thus the mechanical destruction of the root and the chemical poisoning of the plant are accomplished simultaneously. The labor required to operate the device is light and a large number of plants may be treated in a short time, rendering the cost of the operation far lower than the cost for any other method previously proposed or used.

The destruction of ants and like vermin, which at times are destructive to lawn surfaces having sandy subsoil, is also easily accomplished with my device and up to the time of my invention this was another problem which I believe had not been solved.

In the drawings Fig. 1 is a vertical, broken section of one form of my device;

Figure 1:
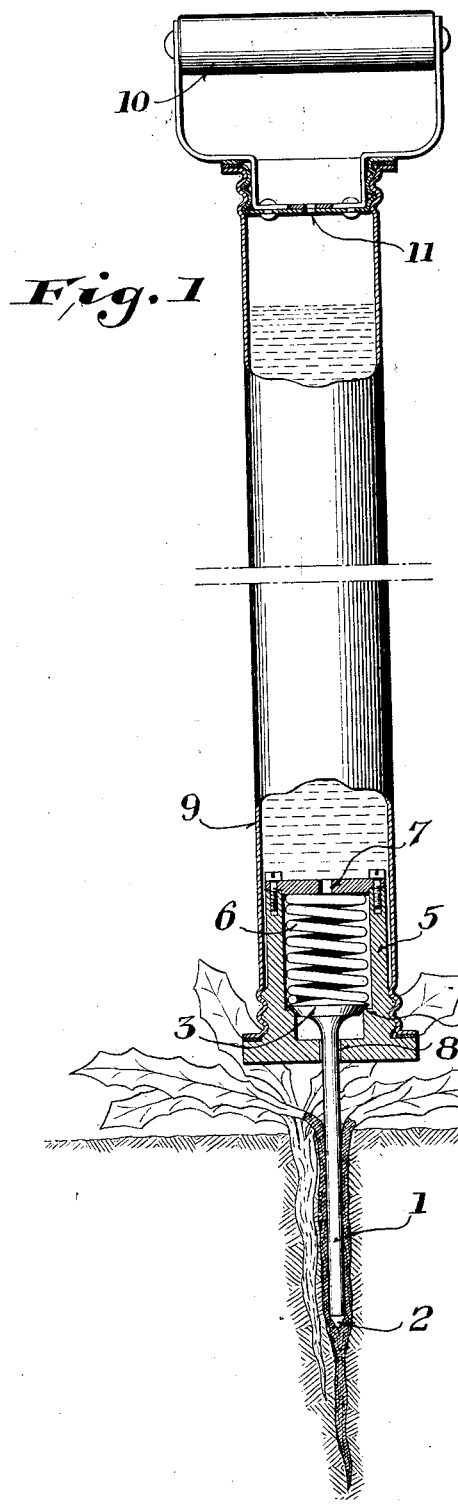

My preferred form of device, of which the following is one embodiment, comprises a skewer, indicated in the drawings by the numeral 1, with a point 2. The upper end of said skewer is formed into a valve 3 normally held closed against its seat 4 in valve cage 5 by a spring 6. Cage 5, complete with opening 7 to admit fluid to the valve and opening 8 to guide the valve stem and discharge fluid from the valve, is inserted in and attached to the end of reservoir 9. The numeral 11 represents a vent or opening to atmosphere. The reservoir 9 is filled with a plant-killing or disinfecting fluid. The reservoir is tubular in shape and of such dimensions that when skewer 1 rests upon the ground the handle 10 is at walking stick height so that in practicing the method the operator has but to walk from plant to plant or from burrow to burrow, holding said device as a walking stick and administering a dose of fluid by placing said skewer at the point desired and by applying sufficient downward force on the handle 10 to drive said skewer into the burrows or the roots of the plant, at the same time compressing spring 6, unseating valve 3 and releasing a flow of fluid through valve 3 and outlet 8. The handle 5 may then be moved sideways slightly and lifted and in withdrawing said skewer 1 said fluid runs by gravity into the cavity left by the said skewer. The fluid then spreads and diffuses into a portion of the soil in the vicinity of said cavity and renders unfit for life, for the particular body the fluid is designed to kill, said portion of the soil.

Figure 2:
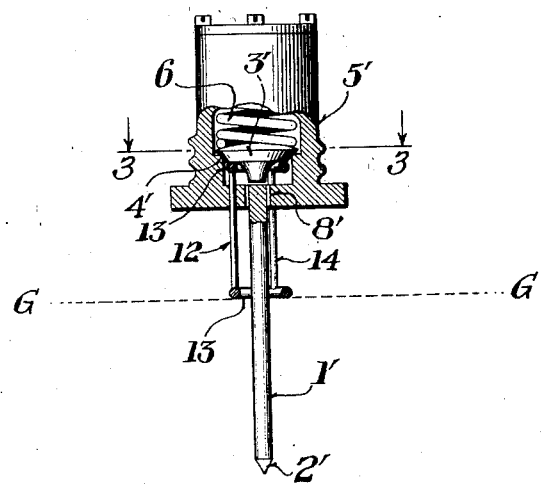
Fig. 2 is a vertical, broken section of the valve mechanism of another form of my device.
Figure 3:
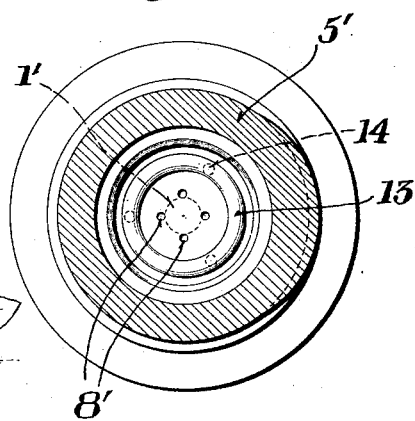
Fig. 3 is a horizontal section of the valve mechanism shown in Fig. 2, taken at the plane indicated by line 3—3 and shown with the valve removed.

While in this, my preferred form of device, I have shown a tubular form of reservoir having a capacity for a limited amount of fluid, any other shape of reservoir may be used to provide any capacity for the fluid desired. Also, although I have shown a valve arranged to open with the first downward force on handle 10, the valve may be constructed, as shown in Fig. 2, to open only after the skewer has penetrated to a determined depth, indicated by the broken line G—G. This form of my device comprises valve 3' in valve cage 5', normally held closed against seat 4' by spring 6. Valve 3' is without a stem and is actuated by valve lifter 12 after skewer 1' has penetrated to the level G—G. Valve lifter 12 is formed of rings 13, 13 connected with push-rods 14 passing through openings in valve cage 5'. Skewer 1' is rigidly attached to valve cage 5' and the fluid discharges through openings 8'.

Having thus fully described my invention, what I claim as new and desire to secure by Letters Patent is:

In a plant or vermin-killing device, the combination of a fluid reservoir, a cup-shaped valve body provided with a valve seat and a valve opening forming the bottom of said reservoir and inserted therein, a valve with a downwardly extending stem closing said valve opening, and a spiral compression spring mounted above said valve and urging the same to a closed position, said spring being totally enclosed within said cup-shaped body and supported laterally and externally thereby.

In testimony whereof, I affix my signature.

ALBERT C. ARENS.